Patented May 10, 1949

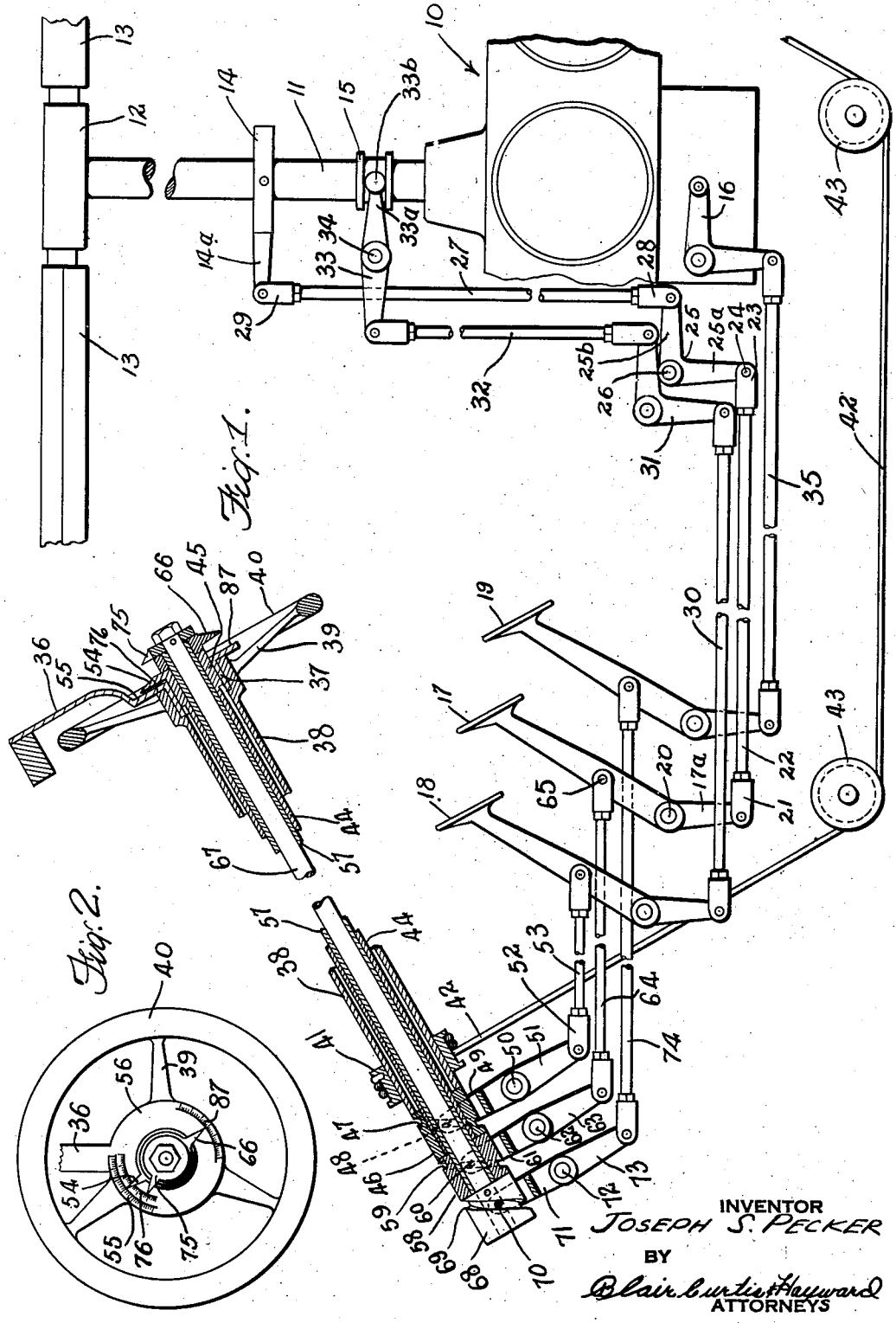

2,469,780

UNITED STATES PATENT OFFICE 2,469,780

INSTRUMENT FOR ROTARY WING AIRCRAFT

Joseph S. Pecker, Los Angeles, Calif.

Application January 18, 1946, Serial No. 641,959

2 Claims. (Cl. 170—135.73)

This invention relates to an instrument for helicopters, and more particularly to an instrument for indicating instantly to the pilot various operative conditions of the helicopter rotor.

In theory, at least, the performance of a helicopter, in hovering or any other attitude of flight, is at highest efficiency when a given R. P. M. of the rotor is accompanied by a specific pitch angle of the rotor blades. If, for example, the pitch angle, i. e. the angle of attack, of the rotor blades is less than the optimum for a given engine R. P. M., it would be necessary for the pilot to adjust his throttle so as to increase the engine R. P. M. Conversely, if for a given engine R. P. M., the rotor blade angle of attack is in excess of the optimum, instability would result. When, however, the blade angle of attack and the engine R. P. M. are properly correlated, the helicopter will hover most efficiently. It is true, of course, that experienced helicopter pilots ultimately attain a feel by which they instinctively adjust the angle of attack of the blades to a given R. P. M., or vice versa, without the necessity of manipulating both the engine and blade controls. The less experienced pilot, however, often has difficulty in attaining the most efficient related angle of attack and engine R. P. M., and while he may be able to maintain the helicopter in stationary or hovering flight, it often happens that he does so only by use of excessive expenditure of engine power, hence fuel consumption.

It is accordingly important for either the inexperienced or experienced pilot to have some means of quickly indicating to him whether or not his engine and rotor blade controls are not only correlated for hovering, but more important, are correlated at predetermined optimum values, wherein the helicopter performance is most efficient.

Then too, if the pilot is attempting to hover in the face of a wind, he must of necessity adjust the angle of inclination of the rotor, so as to impart to the helicopter a projecting impulse equal and opposite to the force of wind, so as to obtain a zero resultant to permit hovering. Of course, under static wind conditions, the virtual plane of rotor rotation is essentially normal to the axis of rotation.

It is then among the objects of my invention to provide an instrument for installation with certain of the helicopter rotor controls, whereby the optimum settings thereof can readily be made and indicated, to the end of maintaining the helicopter in hovering condition at highest efficiency. Another object is to provide such a device which is thoroughly simple and practical, sturdy and reliable in use, and of ready utility to inexperienced, as well as experienced pilots. Other objects will be in part apparent, and in part pointed out hereinafter.

In accordance with one form of my invention, the helicopter is provided with a manual control for adjusting the angle of attack of the rotor blades, another control for adjusting the angle of inclination of the rotor, and still another attached to the throttle of the engine. Attached to each of these controls is a mechanism whereby manipulation of any is immediately indicated on a dial, the indicators for each control being so arranged relative to the graduations on the dial that coincidence of the indicators, or any other predetermined relationship thereamong, immediately indicates to the pilot that the controls are set at optimum values, i. e. values at which most efficient performance is being obtained.

In the drawing,

Figure 1 is a fragmentary schematic elevation, partly in section, of the helicopter engine, rotor, engine and rotor controls and control condition indicators; and, Figure 2 is a plan view of the helicopter hand wheel.

In Figure 1, the helicopter engine, generally indicated at 10, has connected thereto a drive shaft 11, to which is secured in conventional manner, a rotor 12, having blades 13 connected thereto in the usual fashion to permit pivotal and flapping movement thereof, relative to the rotor hub. It will, of course, be understood that the rotor may be equipped with conventional cyclic control apparatus not shown herein as not relating to the invention hereinafter disclosed.

The angle of inclination of rotor 12 may be controlled by manipulation of a swash plate 14. The angle of attack of blades 13 may be controlled by manipulation of a slip ring 15, while the engine R. P. M. may be controlled by manipulation of a throttle lever 16. These several controlling elements may be manipulated respectively by foot levers 17, 18 and 19, it being understood, of course, that hand levers or other manually operable members may be used, if desired. Thus foot lever 17 is pivotally mounted on a stud 20, suitably secured to the fuselage (not shown), the lower end 17a of this lever being pivotally connected to a fork 21 adjustably secured to one end of a pull bar 22 or the like. The other end of this pull bar adjustably carries a fork 23 pivotally attached, as by a pin 24, to one arm 25a of a bell crank 25, pivotally mounted on a shaft or pin 26 secured to the fuselage. The other end 25b of bell crank 25 is adjustably connected to the lower end of a vertical pull bar 27, as by a fork 28, the upper end of this vertical pull bar being pivotally connected to an extension arm 14a of swash plate 14, by a fork 29. The swash plate is, of course, operatively connected to the rotor in any well known manner so as to effect cyclic control thereof.

In similar fashion, foot lever 18 is connected by a pull bar 30 to a pivoted bell crank 31 which, by way of a vertical pull rod 32 is connected to one arm of a lever 33, centrally pivoted as at 34. The other arm of lever 33 may be in the form of a yoke 33a, having inwardly directed pins 33b, which ride in a reduction of slip ring 15. The slip ring is attached to the rotor blades in any suitable manner so as to control the angle of attack thereof.

Foot lever 19 is directly connected by a pull bar 35 to throttle 16.

It will, of course, be understood that the disclosed operative connections, i. e. the pull bars and bell cranks, between the foot pedals and their respective controlling members are purely illustrative herein, as there are many obvious equivalents thereof. For example, the pedal motions could be effectively transferred by means of appropriate cables, pulleys and springs, or, if a more elaborate system were desirable, servomotors could be used. In other words, my invention is not to be limited to the specific means disclosed for transferring the motions of the foot pedals.

It may now be seen that if foot lever 17 is rocked counterclockwise, swash plate 14 is rocked clockwise, thus to vary the rotor inclination. Counterclockwise movement of foot lever 18 results in downward movement of slip ring 15, with a resulting variation of the angle of attack of the rotor blades 13. In like manner, counterclockwise movement of foot lever 19 advances throttle 16.

Conveniently mounted in the cockpit of the helicopter is a fixed brace 36, having an angularly and downwardly extending hub 37, on which is rotatably mounted the upper end of a tube 38 from which extend the attached spokes 39 of a hand wheel 40. Adjacent the lower end of tube 38 is a drum 41, to which is secured one end of a cable 42, which cable is conveniently carried over a suitable number of idlers 43, and has its other end attached to conventional anti-torque controls (not shown).

Disposed within tube 38 is a sleeve 44, having an enlarged upper end 45, rotatably carried by the inner periphery of brace hub 37. To the lower end of sleeve 45 is attached a hub 46, in which is cut a spiral cam slot 47, adapted to receive the inwardly directed pins 48 of a yoke 49, pivotally fastened, as by a pin 50, to the fuselage. The other end of yoke 49 comprises an arm 51, which is pivotally attached, as by a fork 52, to one end of a pull rod 53, the other end of this pull rod being attached to foot lever 18.

It follows then, that when foot lever 18 is manipulated, e. g. rocked counterclockwise, yoke 49 is rocked clockwise. Cam slot 47 in sleeve hub 46 is so positioned that upon such clockwise movement of yoke 49, its pins 48, which ride in the cam slot, impart rotary movement to the hub, and accordingly to sleeve 45, thereby rotating a pointer 54 fastened to the upper end of the sleeve. This pointer registers on the graduated surface of a dial 55 (see also Figure 2) marked on a flange-like portion 56 of brace 36. It will accordingly appear that the pilot can immediately read on dial 55 the value of the setting of slip ring 15, and accordingly the value of the angle of attack of the rotor blades.

Within sleeve 44, and rotatably supported relative thereto, is a second sleeve 57, to the lower end of which is attached in any suitable manner a hub 58, having cut therein a cam groove 59, generally similar to cam groove 47 in hub 46. Extending into this groove 59 are the opposed inwardly directed pins 60 of a yoke 61, pivotally mounted as at 62, and having an arm 63 pivotally connected to one end of a pull rod 64. The other end of this pull rod is pivotally connected, as at 65, to the foot lever 17. Thus, as in the case of foot lever 18, counterclockwise movement of foot lever 17 results in rotation of hub 58, so that the inner sleeve 57 is rotated as foot lever 17 is moved. To the upper end of sleeve 57 is attached a pointer 66 which, as shown in Figure 2, registers along a graduated dial 87, marked on the face of brace flange 56. It being remembered that manipulation of foot lever 17 controls swash plate 14 and accordingly the angle of inclination of rotor 12, it may be seen that the pilot can at any time read the momentary value of the rotor's angle of inclination.

In generally similar fashion, the value of the setting of throttle 16 may be determined. Thus within inner sleeve 57 is rotatably disposed a shaft 67, the lower end of which carries a hub 68, provided with a cam slot 69, similar to the slots hereinbefore described. This slot 69 receives the opposed pins 70 of a yoke 71, pivoted as at 72, and having its arm 73 attached to one end of a pull rod 74. The other end of this pull rod is pivotally fastened to foot lever 19 which, as hereinbefore described, may be manipulated to control the setting of throttle 16. Thus, when foot lever 19 is rocked in one direction or the other, this movement is translated into rotary movement of shaft 67, so that a pointer 75 fastened to the upper end thereof, and registering with a dial 76 on the face of brace flange 56 will indicate the value of the throttle setting.

Thus if the several dials 55, 87 and 76 are so marked as to indicate an optimum combination of rotor blade angle of attack value, throttle setting and rotor inclination value, it is a relatively simple matter for the pilot to adjust the foot levers 17, 18 and 19 until the indicators controlled thereby register with the graduations corresponding to such optimum values. Inasmuch as these optimum values can be found empirically, the rotor blades and engine R. P. M. can be quickly and easily correlated to maintain the helicopter in hovering condition at highest efficiency.

Thus it may be seen that I have provided an instrument for helicopters which fulfills the several objects set forth hereinabove in a thoroughly practical and efficient manner.

As many possible embodiments may be made of the above invention, and as many changes might be made in the embodiment above set forth, it is to be understood that all matter hereinbefore set forth or shown in the accompanying drawing is to be interpreted as illustrative and not in a limiting sense.

I claim:

1. In apparatus of the character described, the combination with helicopter rotor and engine control levers of an indicator for each of said levers, means connecting each of said levers to its respective indicator so that movement of any control lever is reflected by corresponding movement of its indicator whereby the pilot can observe momentary values of engine and rotor conditions, and means associated with said indicators for indicating to the pilot the attainment of predetermined optimum values for the rotor and engine operative conditions at which the helicopter is most efficiently maintained in a condition of flight, the means which connects each of said levers to its respective indicator including cooperating cam and lever means, each lever being connected to one of said control levers and each cam being connected to the corresponding indicator.

2. Apparatus according to claim 1, wherein the connections between said cams and their respective indicators comprise concentrically arranged relatively rotatable tubular members.

JOSEPH S. PECKER.

REFERENCES CITED

The following references are of record in the file of this patent:

UNITED STATES PATENTS

| Number | Name | Date |
| --- | --- | --- |
| 1,878,732 | Thompson | Sept. 20, 1932 |
| 1,984,292 | Walber | Dec. 11, 1934 |
| 2,007,417 | Aivaz | July 9, 1935 |
| 2,091,029 | D'Ascanio | Aug. 24, 1937 |
| 2,115,485 | Dodson | Apr. 26, 1938 |
| 2,343,378 | Kieser | Mar. 7, 1944 |
| 2,423,191 | Kopp | July 1, 1947 |